US009605993B2

(12) United States Patent
Ziebart et al.

(10) Patent No.: US 9,605,993 B2
(45) Date of Patent: Mar. 28, 2017

(54) LOAD CELL WITH A MEANS TO COMPENSATE FOR ERRORS DUE TO MISALIGNMENT

(71) Applicant: Mettler-Toledo AG, Greifensee (CH)

(72) Inventors: Volker Ziebart, Wiesendangen (CH); Klaus Peter Selig, Greifensee (CH); Urs Loher, Widen (CH)

(73) Assignee: Mettler-Toledo GmbH, Greifensee (CH)

( * ) Notice: Subject to any disclaimer, the term of this patent is extended or adjusted under 35 U.S.C. 154(b) by 133 days.

(21) Appl. No.: 14/650,634

(22) PCT Filed: Dec. 5, 2013

(86) PCT No.: PCT/EP2013/075682
§ 371 (c)(1),
(2) Date: Jun. 9, 2015

(87) PCT Pub. No.: WO2014/095397
PCT Pub. Date: Jun. 26, 2014

(65) Prior Publication Data
US 2015/0308883 A1 Oct. 29, 2015

(30) Foreign Application Priority Data

Dec. 19, 2012 (EP) ..................................... 12198128

(51) Int. Cl.
*G01G 3/142* (2006.01)
*G01G 23/02* (2006.01)
(Continued)

(52) U.S. Cl.
CPC ......... *G01G 3/1414* (2013.01); *G01G 3/1408* (2013.01); *G01G 23/002* (2013.01);
(Continued)

(58) Field of Classification Search
CPC .. G01G 3/1408; G01G 3/1414; G01G 23/002; G01L 1/26; G01L 1/2218; G01L 1/2268
See application file for complete search history.

(56) References Cited

U.S. PATENT DOCUMENTS 3,621,927 A * 11/1971 Ormond ................... G01G 3/12
177/211
4,876,524 A 10/1989 Jenkins
(Continued)

FOREIGN PATENT DOCUMENTS

CA 2893016 A1 * 6/2014 .......... G01G 3/1408
JP 2007-33137 A 2/2007
(Continued)

*Primary Examiner* — Randy Gibson
(74) *Attorney, Agent, or Firm* — Standley Law Group LLP (57) ABSTRACT

A load cell (1) has a deformable body with upper and lower contact surfaces (3, 4), through which a force is introduced. Support points (5) of the contact surfaces define a line of action (6) of the force. At least one column-shaped portion (7) of the deformable body has a central longitudinal axis (8) and a circumferential surface whose generating line runs parallel to the central longitudinal axis (8). A first determining means (9) installed on the column-shaped portion converts a mechanical deformation into an electronic signal, and a second determining means (10) installed on the column-shaped portion converts a deviation of the central longitudinal axis (8) from the line of action (6) into a representative signal. Each determining means has at least one strain gauge.

17 Claims, 8 Drawing Sheets

(51) Int. Cl.
*G01L 1/22* (2006.01)
*G01G 3/14* (2006.01)
*G01G 23/00* (2006.01)
*G01L 1/26* (2006.01)

(52) U.S. Cl.
CPC .......... *G01L 1/2218* (2013.01); *G01L 1/2268* (2013.01); *G01L 1/26* (2013.01)

(56) References Cited

U.S. PATENT DOCUMENTS

| | | | |
|---|---|---|---|
| 6,888,074 B2 * | 5/2005 | Haggstrom | G01L 1/2218 |
| | | | 177/211 |
| 7,188,535 B1 | 3/2007 | Spletzer | |
| 7,342,185 B2 * | 3/2008 | Haggstrom | G01G 3/1408 |
| | | | 177/211 |

FOREIGN PATENT DOCUMENTS

| | | | |
|---|---|---|---|
| JP | 4408518 B2 | 11/2009 |
| JP | 2010-133785 A | 6/2010 |
| JP | 2010-210357 A | 9/2010 |

* cited by examiner

LOAD CELL WITH A MEANS TO COMPENSATE FOR ERRORS DUE TO MISALIGNMENT

The invention concerns a load cell, specifically of the so-called rocker pin type, with a body that deforms elastically under the weighing load, with a first determining means which is designed to deliver a measurement signal representative of the weighing load and is installed on the outside surface of the deformable body, and with a second determining means designed to determine a compensation value corresponding to a misalignment of the load cell.

Rocker pin load cells find application in the monitoring of the fill level of tanks, for load tubs on trucks, and in on-board weighing systems for vehicles. In most cases, the total load is distributed over a plurality of rocker pin load cells by way of a support structure, for example a weighbridge.

Rocker pin load cells, in general terms, are cylindrical load cells receiving the weighing load in the direction of the axis of rotational symmetry between two load-introducing elements. For the application of the force to the cylindrical load cells, the latter have convex-domed end surfaces whose curvature radius is normally larger than half the height of the load cell. This has the effect that the load cell is self-righting, meaning that an out-of-vertical position of the load cell will give rise to restoring forces that tend to return the load cell to a vertical position. If several load cells are arranged in combination, for example in a weighbridge, the individual load cells are no longer completely independent, as they are mechanically coupled and therefore influence each other. The individual restoring forces of the load cells act together in such a way that the mechanical energy of the system overall is minimized. The individual load cells, however, can take on out-of-vertical positions.

A rocker pin load cell correctly measures the weight force acting on it only if the overall arrangement consisting of the deformable body and the upper and lower load-introducing elements meets two criteria. First, the deformable body and the two planar load-introducing elements have to be aligned along a common axis, meaning that the two load-introducing elements are parallel to each other and that the longitudinal axis of the deformable body is parallel to the normal vector of the surface of the load-introducing elements. Second, the direction of gravity has to coincide with the common axis of said overall arrangement. If both criteria are met, the load cell is said to be in perfect alignment. The perfect alignment of a rocker pin load cell is essential for the accurate determination of the weight force of a load that is to be measured.

Gravimetric measuring instruments, including systems with rocker pin load cells, serve to determine the weight which corresponds to the mass of the applied load. The weight, i.e. the gravitational force $F_G$ acting on a body, is the product of the mass m of the body multiplied by the local gravitational acceleration g. Assuming an average gravitational acceleration of $g=9.81$ [m/s$^2$] (or 9.81 [N/kg]) a body with a mass of m=1 [kg] exerts a weight of $F_G=m*g=9.81$ [N] on a surface on which the body is resting. By the above definition, the gravitational force is always tied to the direction of the gravitational acceleration g, and the measured value for $F_G$ depends on the effective local value of g at the site of the gravimetric measuring instrument.

The first criterion can also be stated as the condition that the line connecting the two current contact points where the deformable body meets the load-introducing elements has to coincide with the longitudinal axis of the deformable body. This situation will hereinafter be referred to as the ideal force introduction arrangement. However, in the ideal force introduction arrangement, the common axis, i.e. the central longitudinal axis coinciding with the line of action of the force being transmitted, can still deviate from the direction of gravity. This deviation has two degrees of freedom in the direction perpendicular to the force of gravity, which can be described in terms of two angles in mutually orthogonal planes.

In contrast, a deviation from the ideal force introduction arrangement wherein the connecting line between the upper and lower contact points does not coincide with the longitudinal axis of the deformable body is characterized by four degrees of freedom. These four degrees of freedom correspond to four transformations through which the connecting line is brought into coincidence with the longitudinal axis of the deformable body. This process generally requires two rotations about mutually orthogonal axes through which the connecting line is made parallel to the longitudinal axis, and subsequently two lateral displacements in mutually orthogonal directions through which the connecting line and the longitudinal axis are brought into coincidence with each other.

A load cell with a deformable body and two load-introducing elements which has been installed and put into operation can deviate from the perfect alignment. The deviation has a total of six degrees of freedom, as each of the load-introducing elements and the deformable body can be inclined at an angle relative to two mutually orthogonal directions. The same number of degrees of freedom is obtained as a result of adding the four degrees of freedom for the deviation from the ideal force introduction arrangement to the two degrees of freedom for the deviation of the central longitudinal axis from the perfect alignment.

Any misalignment of the load cell is basically a deviation from the state of perfect alignment as defined above. As a first component of the misalignment, the deformable body itself can be positioned at an angle, i.e. the central axis of the deformable body does not run parallel to the direction of gravity, while the load cell-facing surfaces of the load-introducing elements remain orthogonal to the direction of gravity. As a second component of the misalignment, the load-introduction elements can be tilted, i.e. not aligned parallel to each other, while the central longitudinal axis of the deformable body can still run parallel to the direction of gravity. The overall complexity of the misalignment is increased if both deviations from the state of perfect alignment, i.e. the out-of-vertical position of the deformable body and the out-of-level position of the load-introduction elements, occur simultaneously. Thus, in the terminology of engineering mechanics, the overall system has six degrees of freedom.

A misalignment can be caused by a number of different factors. Assuming that a load cell was installed in perfect alignment, an out-of-vertical position of the deformable body can be caused for example by a thermal expansion of the weighbridge, and an out-of-level position of the load-introduction elements can be caused for example by a sagging of the weighbridge. However, an out-of-vertical and/or an out-of-level condition can also be the result of inaccuracies that occurred already when the load cell was installed in the weighing system.

The misalignment of the load cell causes a measurement error which depends in particular on the geometry of the load cell itself, i.e. on the height of the load cell, the radii at the two ends, and the diameter. The general magnitude of the measurement error is quite considerable and can amount to several thousand ppm (parts per million) of the measurement signal at capacity load.

The measurement errors that occur as a result of misalignments can be divided into two error categories. Rocker pin load cells, including their load-introducing elements and measurement sensors or detecting means that may be attached to them, are rotationally symmetric with regard to 90° rotations of the load cell about its central longitudinal axis.

The first type of error is caused by a deviation from this rotational symmetry. The measurement error of the first type is therefore an odd function of the out-of-level and/or out-of-vertical position angle, meaning that when the sign of the angle changes between plus and minus, the sign of the associated measurement error changes simultaneously. In other words, the measurement error is essentially a linear function of the out-of-level and/or out-of-vertical position angle. This measurement error is also often referred to as eccentric load error and can be made to disappear either by restoring the rotational symmetry or by removing surface material at selected surface locations of the load cell through a grinding operation.

The second type of error exists even under conditions of perfect rotational symmetry and is determined by the geometry of the load cell. Due to the geometric symmetry, this measurement error is an even function of the out-of-level and/or out-of-vertical position angle, i.e. the measurement error is independent of the sign of the out-of-level and/or out-of-vertical position angle.

As new guidelines are developed, the standards for the accuracy of the measurement results and for the detection and correction of measurement errors are continuously increased. In order to effectively deal with the complex problem of misalignment, a large number of measurement sensors are required. Or in other words, in order to realize an acceptable compensation, one has to acquire the same number of independent measurement values as there are degrees of freedom. The number of degrees of freedom thus determines how many measurement sensors are required.

As a way to reduce the complexity of the misalignment problem, i.e. to reduce the number of degrees of freedom, one may assume by way of approximation that the load-introducing element next to the underlying foundation remains fixed in a horizontal position. The number of degrees of freedom is thus cut down to four.

A rocker pin load cell with detecting means is disclosed for example in JP 4 408 518 B2. In this load cell, the force exerted by the weighing load is measured by means of strain gauges that are attached to the deformable body in the longitudinal direction of the central axis. An-out-of-vertical position of the deformable body of this load cell is measured by an inclination sensor which allows the angular deviation from the vertical to be determined. The angle of inclination is measured by means of contact surfaces and a dielectric liquid that is contained in a ring-shaped enclosure. This arrangement has the disadvantage of using a separate inclination sensor at considerable cost in addition to the strain gauges that are attached to the deformable body. It is also a drawback that the load cell disclosed in this reference cannot distinguish between the different types of misalignment. If the central lengthwise axis of the deformable body is aligned in the direction of gravity, a possible misalignment of the load-introducing elements will not be taken into account in the calculation of the weighing result. In addition, this sensor is susceptible to malfunction, raises the cost of the load cell for the user and does not include a compensation for the long-term drift of the inclination sensor. This means that a drift in the measurement value of the inclination sensor cannot be detected and that the load cell will therefore have to be checked periodically.

A load cell that is similar to the aforementioned device is disclosed in JP 2010 133 785 A. In this load cell the force exerted by the weighing load is measured by means of two pairs of strain gauges, each of which has one strain gauge aligned in the longitudinal direction and the other in the transverse direction relative to the central lengthwise axis. An-out-of-vertical position of the deformable body of this load cell is measured likewise by an inclination sensor similar to the arrangement described above, but with an improvement that enables the inclination sensor to determine not only the magnitude but also the direction of the angular deviation from the vertical. This arrangement still has the disadvantage of requiring a separate inclination sensor in addition to the strain gauges. Nevertheless, the signals acquired from the strain gauges and from the sensor are not sufficient for a compensation of the weighing load signal in which all degrees of freedom of the misalignments of the load cell and the load-introducing elements are taken into account. Also missing is a compensation of the long-term drift of the inclination sensor. Thus, while this arrangement improves the measurement result in comparison to the first-mentioned device, it still suffers from the same disadvantages, since the same principle is used for the measurement of the misalignment of the load cell.

Further, a rocker pin load cell which is disclosed in EP 1 486 762 A2 is equipped with means for the compensation of the eccentric load error that is caused by imperfections of the load cell. For example, the strain gauges can differ from each other in sensitivity and/or resistance value, or the geometry of the deformable body may not be perfectly symmetric. In a Wheatstone bridge circuit, trimming resistors are added to compensate for unequal signals in the branches of the circuit. However, with this method only the linear measurement error is corrected which is caused by a deviation from rotational symmetry.

In JP 2007 033 127 A, a column-shaped load-bearing element is disclosed, for example for a weighbridge in a truck scale. Similar to the device disclosed in JP 2010 133 785 A, this load cell is likewise equipped with a plurality of strain gauges so that, in addition to the deformation that is caused by the weighing load, the further deformation that results from a misalignment can also be measured. However, this device is distinguished from JP 2010 133 785 A in that strain gauges are also used to measure the influence of a misalignment. Two strain gauges arranged on respectively opposite sides of the deformable body form a pair in which the two strain gauges are unequally stretched or compressed in case of a misalignment. If the two strain gauges of such a pair are wired in a differential circuit, a bending deformation can be measured. With two pairs of strain gauges at positions rotated 90° from each other about the central axis, a misalignment with two degrees of freedom can be calculated. Thus, with three Wheatstone bridge circuits, one of which is used to measure the deformation caused by the weighing load and one each is used to measure the deformation caused by the misalignment in two mutually orthogonal directions, it is possible to calculate the measurement result. In the practical application of this concept, four strain gauges for the determination of the misalignment are arranged on the load-bearing element. This complicates the manufacturing process of the load cell, in particular the installation of the strain gauges on the surface of the deformable body. In spite of the high number of strain gauges, only two degrees of freedom can be determined with this arrangement and in combination with the strain gauges for the load-related deformation, which is too little to detect whether the deformable body is inclined from the vertical position and/or whether the load-introducing elements are not parallel to each other.

According to a further reference, JP 2010 210 357, a strain gauge is set up in the direction of zero stress. This strain gauge is used only for the purpose of achieving a location-specific temperature compensation by including this load-independent resistor in a bridge circuit. The orientation in which the strain gauge is mounted, i.e. the angle relative to the first principal stress direction, is derived from the material-dependent Poisson's ratio. This invention offers no solution for the compensation of a misalignment of the load cell.

A rocker pin load cell differs from a multi-axis force sensor in that only a force component in one direction—namely in the direction of the gravitational acceleration g—is determined. Additional forces and moments along other directions are not relevant to the actual task of the rocker pin load cell, namely to determine the weight.

In view of this state of the art, the present invention has the objective to provide a load cell of robust construction that offers higher accuracy and includes a means to compensate for errors due to misalignment. Furthermore, the aim is to address the misalignment in its entirety, i.e. to include more than two degrees of freedom in the determination of the misalignment, and to improve a load cell with these features in regard to a drift of the measurement values.

It is a further objective that the compensation of misalignment-related errors be realized by simple means. This goes along with the desire to keep the material- and labor costs low in the production of the load cell.

These objectives are met by a load cell that comprises a deformable body with an upper and a lower contact surface. The contact surfaces are designed for the function of introducing the force into the deformable body, in that each contact surface contains a support point, with the two actual support points defining a line of action of the force. Between the two contact surfaces, the deformable body has a column-shaped portion with a central longitudinal axis and a circumferential surface whose generating line runs parallel to the central longitudinal axis. The load cell further comprises a first determining means which is installed on the column-shaped portion of the deformable body and converts the mechanical deformation of the deformable body into an electronic signal, and a second determining means which is installed on the column-shaped portion of the deformable body and converts a deviation of the central longitudinal axis from the line of action into a representative signal. In this installation, the first and second determining means each comprise at least one strain gauge. At the same time, at least one strain gauge of the second determining means is installed essentially midway between the upper and the lower contact surface at a predetermined acute angle relative to the generating line of the circumference surface, in such a way that the signal of the second determining means is zero in the absence of a deviation of the central longitudinal axis from the line of action and thus independent of the weighing load.

The conversion of the mechanical deformation into an electronic signal by the first determination means is carried out in accordance with the magnitude of the mechanical deformation of the deformation body, i.e. the greater the mechanical deformation, the greater is the electronic signal. This electronic signal allows not only a qualitative detection of the presence of a mechanical deformation, but also a quantitative measurement of the size of the mechanical deformation which reflects the degree of mechanical deformation of the deformable body. Similarly, the deviation of the central longitudinal axis from the line of action is converted by the second determining means into an electronic signal according to the size of this deviation. With the second determining means it is thus also possible to make a quantitative measurement, and thus not only to detect the deviation of the central longitudinal axis from the line of action, but also to determine its size.

The distinction between a first determining means and a second determining means lies in the type of information carried by the respective electronic signals. More specifically, the first determining means provides the primary information, namely the deformation of the deformation body along the central longitudinal axis. The second determining means provides information on a position error, which represents auxiliary information.

The ideal load-introduction arrangement of the load cell is defined in geometric terms as a condition where the line of action of the applied force coincides with the central longitudinal axis of the deformable body, i.e. where the line of action and the central longitudinal axis are superimposed on each other. In this case, no bending or transverse shear will occur in the column-shaped portion of the deformable body, and the measurement signal can be used to produce the measurement result without requiring any compensation.

A strain gauge that is installed essentially midway between the upper and the lower contact surface at a predetermined acute angle relative to the generating line of the circumference surface provides maximal sensitivity for the determining of a misalignment of the load cell. A further advantage is gained by setting the tare (zero reference) for the measurement signal when the load cell is in an ideal force introduction condition, or even in perfect alignment, as the zero reference value can be used in the subsequent operation of the load cell for the purpose of monitoring a drift of the first determining means. The monitoring data can also be used for example to compensate for a drift of the measurement value. This can be accomplished for example by zeroing the output value from time to time in the load-free state. Since this kind of load cell in the installed condition is never completely relieved from any load, the zeroing can be performed only when the load falls below a certain threshold value.

The strain gauges used for this type of load cell are normally resistance strain gauges of the metal-foil type. The known state of the art also includes strain gauges based on thin-film technology or based on thick-film technology. It is also possible to use strain sensors that are based on optical principles and/or surface acoustic waves.

According to an advantageous further development of the invention, the predefined acute angle is dependent on the material, specifically on the Poisson ratio of the material being used in the column shaped portion of the deformable body.

In a further advantageous embodiment, the predefined acute angle is in a range from 54 to 72°, dependent on the material being used in the column-shaped portion of the deformable body. For example in a deformable body made of the kind of steel that is normally used, the predefined acute angle is 61.3°.

According to a further developed embodiment of the invention, the first and second determining means are installed to the circumference surface of the column-shaped portion particularly midway between the contact surfaces.

As the introduction of the force into the deformable body is concentrated in the support points, the stress distribution in the deformable body of the load cell is inhomogeneous. This fact is taken into account by the arrangement of the strain gauges midway between the support points, as the strain gauges are located at the cross-section of the column-shaped portion where the stress distribution is most uniform, which is at the largest possible distance from the points of contact. The first determining means could also be located on the same generating line above or below the second determining means, preferably as close as possible to the midpoint between the contact surfaces. One of the advantages of this arrangement is that the strain gauge of the first determining means and the strain gauge of the second determining means can be on the same carrier substrate foil, so that they can be installed and aligned in one work operation, which brings time and cost savings.

According to a further embodiment of the invention, the first and/or the second determining means each comprises of at least two strain gauges or strain gauge pairs installed at diametrically opposite locations relative to the central longitudinal axis. To generate a signal, the diametrically opposed strain gauges are arranged in a Wheatstone bridge circuit in such a way that their contributions additively reinforce each other in the measurement results for the mechanical deformation of the deformable body in the direction of the central longitudinal axis and/or for the deviation of the central longitudinal axis from the line of action of the force.

According to an advantageous embodiment of the invention, two strain gauges or strain gage pairs of the first determining means and/or two strain gauges of the second determining means are installed on the circumference surface at locations that are rotationally offset from each other by an angle, particularly by an angle of 90°, about the central longitudinal axis. In the case of the first determining means, this arrangement provides an improved measurement of the mechanical deformation of the deformable body, and in the case of the second determining means it provides an improved determination of the misalignment, in particular the out-of-vertical position of the deformable body in all spatial directions.

According to a further advantageous embodiment of the invention, the at least two pairs of strain gauges of the second determining means are installed between the strain gauges of the first determining means, specifically midway and offset by an angle of rotation of 90° about the central longitudinal axis. With this arrangement, all of the strain gauges can be installed on the same circumference line of the deformable body.

In a further embodiment of the invention, the second determining means comprises two strain gauges that are installed at the predefined acute angle and four additional strain gauges that are aligned parallel to the central longitudinal axis and installed on the deformable body in pairs diametrically opposite each other, wherein the strain gauges that are aligned at the predefined acute angle and the two pairs of strain gauges, respectively, are rotationally offset from each other by 90° about the central longitudinal axis.

In a preferred embodiment of the invention, the column-shaped portion of the deformable body is divided along its central longitudinal axis into zones with at least two different diameters. Respectively the deformable body is barbell-shaped. For example in load cells for smaller weighing loads, the diameter is reduced in the area where the determining means are located. This increases the material stress in the cross-section of reduced diameter in the column-shaped portion, whereby the amount of deformation is increased. The larger amount of deformation, in turn, produces a stronger signal in the determining means, and the load cell is accordingly adapted to the applied force.

In a further advantageous embodiment, the load cell has a type-specific or unit-specific calibration. In a type-specific calibration, identical parameter values are stored in the respective memories of the processor units of the load cells if the latter are of the same type or the same model series. The parameter values are in this case based on averages obtained from a small number of random sample measurements and are applied equally to all of the other load cells. This simplifies the production process and lowers the manufacturing cost. The unit-specific calibration is performed in cases where the load cell has to meet a higher standard of accuracy. In this case, the parameter values are determined individually for each load cell.

A weighing scale, particularly a vehicle scale, tank scale or container scale, has at least one load cell. The at least one load cell has a first determining means which converts the mechanical deformation of the deformable body into a signal, and a second determining means which converts a deviation of the central longitudinal axis from the line of action of the force into a corresponding signal. The first determining means and the second determining means each have at least one strain gauge, wherein the latter is installed, essentially midway, between the upper contact surface and the lower contact surface and, in the case of the second determining means, inclined at a predefined acute angle relative to a generating line of the circumferential surface, so that the signal of the second determining means is zero in the absence of a deviation of the central longitudinal axis from the line of action and thus independent of the weighing load.

In a method to compensate a misalignment of a load cell, the load cell comprises a deformable body with an upper and a lower contact surface. The contact surfaces are designed to introduce the force into the deformable body in that each contact surface contains a support point, with the two actual support points defining a line of action of the force. Between the two contact surfaces, the deformable body has column-shaped portion with a central longitudinal axis and a circumferential surface whose generating line runs parallel to the central longitudinal axis. The load cell further comprises a first determining means and a second determining means, wherein each of said first determining means and said second determining means comprise at least one strain gauge. The method is characterized by the steps that at least one strain gauge is provided as first determining means on the circumference surface of the deformable body in such a way that the mechanical deformation of the deformable body is converted into a signal of the first determining means, and that at least one strain gauge is provided as second determining means on the circumference surface of the deformable body in such a way that a deviation of the central longitudinal axis from the line of action is converted into a signal of the second determining means, wherein the at least one strain gauge of the second determining means is installed essentially midway between the upper and the lower contact surface and aligned at a predetermined acute angle relative to the generating line of the circumference surface, in such a way that the signal of the second determining means is zero in the absence of a deviation of the central longitudinal axis from the line of action. In a further step, the signal of the at least one strain gauge of the first determining means is registered, and subsequently or simultaneously the signal of the at least one strain gauge of the second determining means, which is aligned at the predetermined acute angle relative to the generating line of the circumference surface, is registered. Next, compensation values are determined relative to a misalignment of the load cell, wherein at least one signal of the second determining means is used. In a following step, the weighing result is calculated based on the signals of the first and second determining means and the compensation values.

In a further method, a distinction is made in the determination of the compensation values between the conditions where the load-introducing elements are offset parallel to each other, where they are tilted at an angle to each other, and where they are both offset as well as tilted relative to each other. Or in other words, in the determination of the compensation values one differentiates between the cases of an out-of-vertical position of the deformable body, an out-of-horizontal tilt of the load-introducing elements, and a combination of an out-of-vertical deformable body and out-of-horizontal load-introducing elements.

In a further method, the signals of the strain gauges of the first determining means and/or of the second determining means can be determined in a processor unit individually and/or in pairs. The processor unit of the load cell can thus extract the maximum amount of information from the signals of the strain gauges in order to achieve the best possible compensation of a misalignment.

According to a further method, the individual signals of the first and/or the second determining means are processed sequentially in the processor unit, for example with at least one bridge circuit. Thus the number of bridge circuits can be kept low. The signals are in this case connected individually and sequentially to the at least one bridge circuit by means of an additional switching circuit.

Details of the load cell and of the method for the compensation of errors due to misalignment according to the invention are presented in the description of the examples of embodiments that are illustrated in the drawings.

BRIEF DESCRIPTION OF DRAWINGS

The subject of the invention will be further illuminated hereinafter through examples of preferred embodiments that are shown in the attached drawings, wherein.

Figure 1:
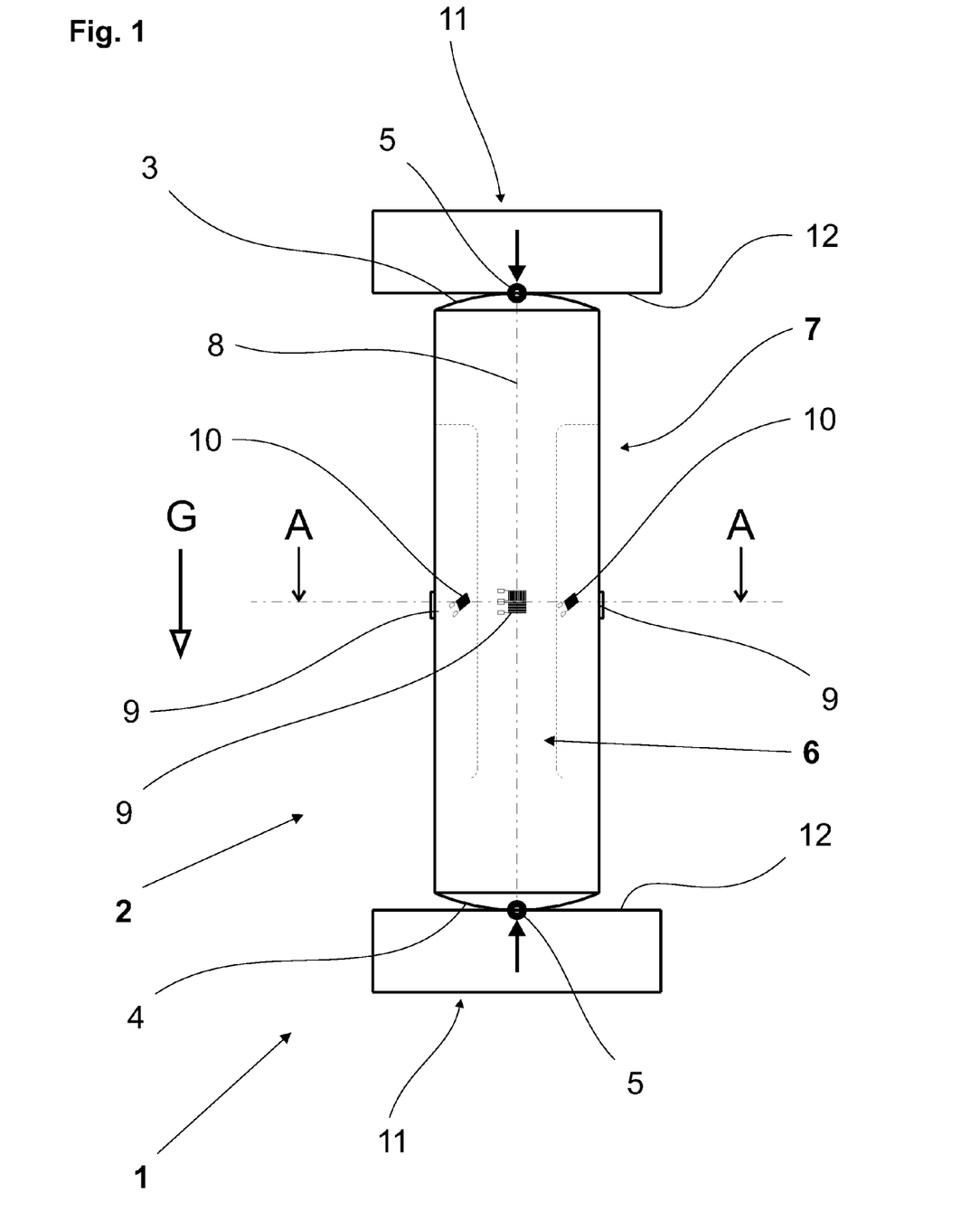
FIG. 1 shows a frontal view of the load cell in perfect alignment, with a first determining means and with a second determining means installed at an oblique angle on the same circumference line as the first determining means.

FIG. 1 shows a front elevation of a load cell 1 with a deformable body 2 between two load-introducing elements 11 in a condition of perfect alignment. The deformable body 2 is in contact with each of the load-introducing elements 11 at one respective support point 5, as both the upper contact surface 3 and the lower contact surface 4 are convex spherical surfaces. The weight force of a weighing object is transmitted to the deformable body through the load-introducing elements 11, as symbolized here by two arrows. With force-transmitting contact taking place at the two support points 5, the weight force can act only along a line of action 6 which is defined by the two support points 5. The best weighing results are obtained with a load cell 1 that is in perfect alignment, i.e. if the central longitudinal axis 8 of the column-shaped portion 7 of the deformable body 2 is aligned in the direction of gravity G and if the normal vectors of the surfaces 12 of the load-introducing elements 11 facing towards the deformable body 2 are parallel to the central longitudinal axis 8, or in other words, if the line of action 6 and the central longitudinal axis 8 of the column-shaped portion 7 of the deformable body 2 coincide with each other and are aligned in the direction of gravity G.

In order to adapt a load cell 1 to a given weighing range, the column-shaped portion 7 of the deformable body 2 is divided along the central longitudinal axis 8 into zones with at least two different diameters. As indicated in FIG. 1 by thin dotted lines, the column-shaped portion 7 of the deformable body 2 is thereby given in particular the shape of a barbell. A load cell 1 of a given overall size can thus be adapted to specific weighing requirements, specifically to the weighing range required for the application of the user.

When a force is applied to the deformable body 2, the latter will change its shape. In the case of a load cell under a compressive load, the deformable body 2 is compressed (shortened) in the direction of the central longitudinal axis 8 and expanded (widened) in the radial direction perpendicular to the central longitudinal axis 8. As a consequence of this deformation, a strain component $\in_1$ occurs in the direction of the central longitudinal axis 8 (first principal direction), and a strain component $\in_2$ occurs perpendicular to the central longitudinal axis 8 (second principal direction). The strain $\in_2$ which occurs as a result of the so-called lateral contraction is defined as the transverse strain. Poisson's number μ, a material-specific constant, is the ratio between the strains $\epsilon_2$ and $\epsilon_1$. Under a uniaxial stress conditions, the relationship between the strains $\epsilon_1$ and $\epsilon_2$ is $$\epsilon_2 = \mu \cdot \epsilon_1$$

The negative sign in the equation indicates that one of the strains is tensile, the other is contractive, and vice versa. Therefore, in a graph of the strain $\epsilon$ as a function of the angle $\theta$ measured from the first principal direction towards the second principal direction, there has to be a zero crossing, i.e. an angle $\theta$ defining a direction in which the normal stress vanishes, i.e. equals zero. The angle $\theta$ for the zero crossing is determined by the equation $$\epsilon_0 = 0.5 \cdot \epsilon_1 \cdot [1 - \mu + (1+\mu) \cdot \cos(2 \cdot \theta)] = 0.$$

In this equation $\theta$ is the angle between the zero-deformation direction and the first principal direction. With a Poisson number of $\mu=0.3$, one obtains an angle $\theta$ of 61.3°. The direction in which no normal strain occurs is referred to herein as the zero-deformation direction.

The strain gauges of the first determining means 9 are installed on the circumference surface of the column-shaped portion 7 of the deformable body 2 along the same circumference line, preferably at a location where the stress-distribution in the column-shaped portion 7 of the deformable body 2 is as close to homogeneous as possible, i.e. preferably midway between the contact surfaces 3 and 4. The first determining means 9 shown in FIG. 1 is constituted by a total of eight strain gauges installed in pairs at four sensor locations, meaning that there are two strain gauges at each location, one of which converts a deformation in the direction of the central longitudinal axis 8 (first principal direction) and the other converts a deformation in the transverse direction at 90° to the central longitudinal axis 8 (second principal direction) into a signal. A measurement of the deformation at 90° transverse to the direction of the central longitudinal axis 8 provides a supplementary signal in addition to the primary signal which is measured in the direction of the central longitudinal axis 8. The deformation in the deformable body 2 causes the strain gauges to change their lengths and thus their electrical resistance. Depending on the orientation of a strain gauge, which is defined by the direction of the conductor tracks (also called meanders), the strain gauge has a specific direction in which it is sensitive to deformation due to a change in length. Based on the resistance change, a processor unit (not shown in FIG. 1) can determine the amount of force acting on the load cell which, in turn, is representative of the mass of the weighing object. The deformation of the deformable body 2, which is made of a metallic material, increases as a linear function of the applied force. The first determining means 9 converts the deformation into an electronic signal proportional to the size of the deformation and thus provides a quantitative measurement.

The second determining means 10 in this example is likewise constituted by strain gauges and is installed preferably midway between the upper contact surface 3 and the lower contact surface 4. Furthermore, the strain gauges of the second determining means 10, of which there are two in the example of FIG. 1, are inclined by the predefined acute angle $\theta$ (see FIG. 3) relative to the central longitudinal axis 8 of the column-shaped portion 7. Accordingly, these strain gauges convert the deformation in the zero-deformation direction at the respective locations of the deformable body 2 into a signal. If the line of action 6 of the applied force coincides with the central longitudinal axis 8 of the column-shaped portion 7 of the deformable body 2, as is the case in the example of FIG. 1, the static conditions of the load cell 1 are those of an ideal force introduction. In this state, a strain gauge of the second determining means 10 is not subjected to a change in length, as there is no strain occurring in the zero-deformation direction. The signal of the second determining means 10 for a load cell 1 in perfect alignment is therefore zero, i.e. independent of the weighing load.

Figure 2:
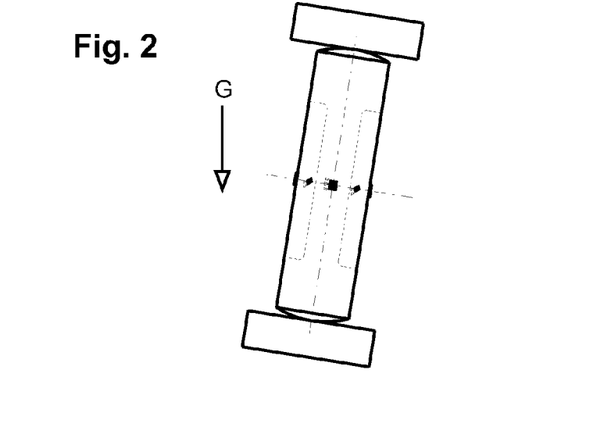
FIG. 2 shows a frontal view of the load cell in an ideal force introduction condition, with a first determining means and with a second determining

The difference between perfect alignment and ideal force-introduction arrangement of a load cell 1 is that in the ideal force-introduction arrangement the central longitudinal axis 8 and the line of action 6, which coincide with each other due to the arrangement of the load-introducing elements 11, need not be aligned parallel to the direction of gravity G. In the case of perfect alignment, the line of action 6, the central longitudinal axis 8 and the direction of gravity G all coincide with each other. Accordingly, the ideal force-introduction arrangement, which is illustrated in FIG. 2, relates only to the arrangement of the deformable body 2 and the upper and lower load-introducing elements 11 relative to each other, but not to their absolute spatial orientations.

Figure 3:
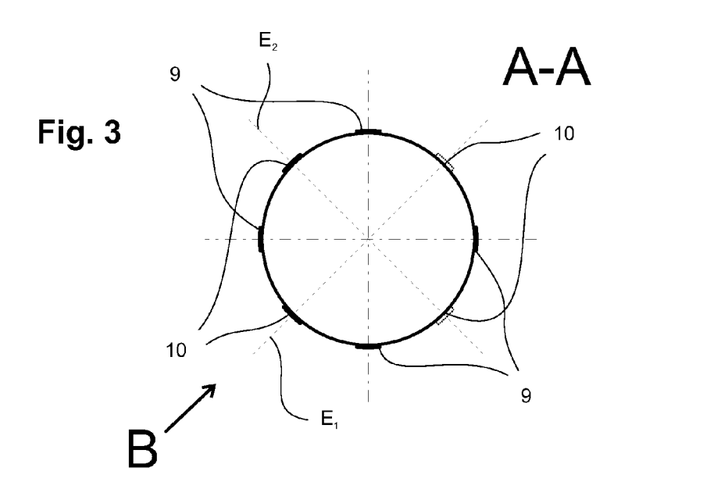
FIG. 3 represents a sectional view of the load cell of FIG. 1 in the plane A-A, with a first determining means and with a second determining means installed at an oblique angle on the same circumference line as the first determining means.

FIG. 3, which represents a sectional view of the load cell of FIG. 1 in the plane A-A, illustrates the arrangement of the first determining means 9 and the second determining means 10 on the circumference of the column-shaped portion 7. The four strain gauge pairs of the first determining means 9 are installed at locations that are rotationally offset from each other by 90° about the central longitudinal axis 8, i.e. in diametrically opposite pairs, and they can be arranged in a Wheatstone bridge circuit. The at least one strain gauge of the second determining means 10 is installed in angular symmetry between two strain gauges of the first determining means 9. The signal of the strain gauge in the case of an imperfectly positioned load cell 1 corresponds to the deviation component in the plane E1. If a further strain gauge is installed on the circumference of the column-shaped portion 7 as a second determining means 10 in a plane E2 which is rotationally offset from the plane E1 by 90° about the central longitudinal axis 8, one obtains in the case of an imperfectly positioned load cell 1 a further signal which corresponds to the deviation component in the plane E2. By combining the deviation components for the two planes E1 and E2, the positional deviation of the load cell 1 can be determined in any desired spatial direction.

If a further strain gauge is added diametrically opposite the first strain gauge for each of the strain gauges of the second determining means 10, the pairs of strain gauges in diametrically opposite positions can be arranged in a Wheatstone bridge circuit in order to obtain a better measurement signal for the positional deviation in the corresponding plane, or the signals of the strain gauges can be evaluated individually in order to have more degrees of freedom available for the compensation.

Figure 4:
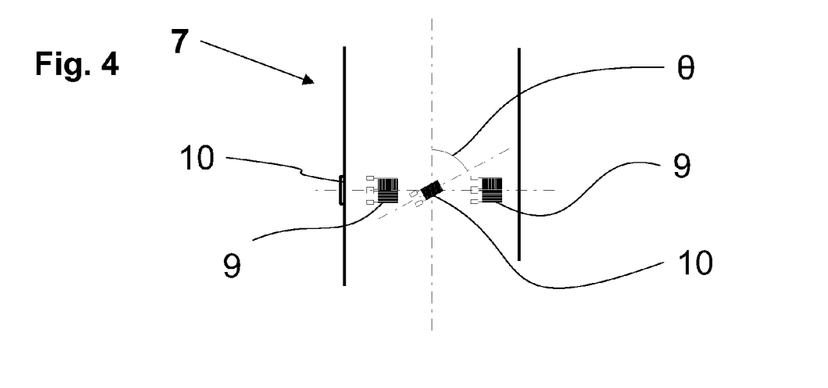
FIG. 4 represents a portion of the load cell of FIG. 3 in the viewing direction B, with a first determining means and with a second determining means installed at an oblique angle on the same circumference line as the first determining means.

FIG. 4 represents a section of the column-shaped portion 7 of the deformable body 2 seen in the viewing direction B of FIG. 3. Installed on the same circumference line as the strain gauges of the first determining means 9 and between the latter is the at least one strain gauge of the second determining means 10. The second determining means 10 is set at an angle $\theta$ relative to the central longitudinal axis 8 of the column-shaped portion 7. This angle depends on the material of the deformable body 2. In the example of FIG. 4 and assuming a grade of steel that is normally used for the deformable body 2, the angle $\theta$ is 61.3°.

Figure 5:
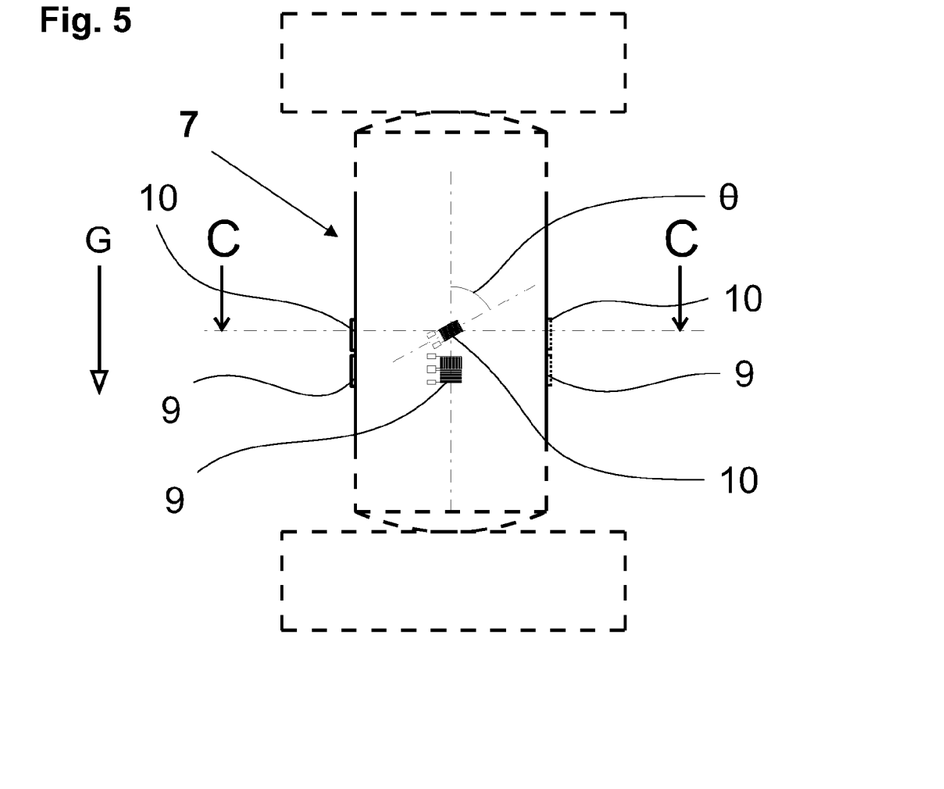
FIG. 5 shows a frontal view of the load cell in perfect alignment, with the first determining means installed below the obliquely aligned second determining means on the same contour-generating line as the second determining means.

The strain gauges of the first determining means 9 and the second determining means 10 do not necessarily have to be installed in the same way as shown in FIGS. 1 to 4 and 7 to 10. It is also possible to install the first determining means 9 above or below the strain gauges of the second determining means 10 which are installed substantially midway between the contact surfaces 3 and 4, as is illustrated in FIG. 5. Although the strain gauges of the first determining means 9 are in this case no longer installed midway on the circumferential surface of the column-shaped portion 7 of the deformable body 2, the stress distribution is still homogeneous enough to obtain a usable signal. The arrangement has the advantage that the strain gauges of the first determining means 9 and of the second determining means 10 can be produced together as a unit on the same carrier substrate foil which can be installed on the deformable body in one work operation. This reduces manufacturing time and cost.

Figure 6:
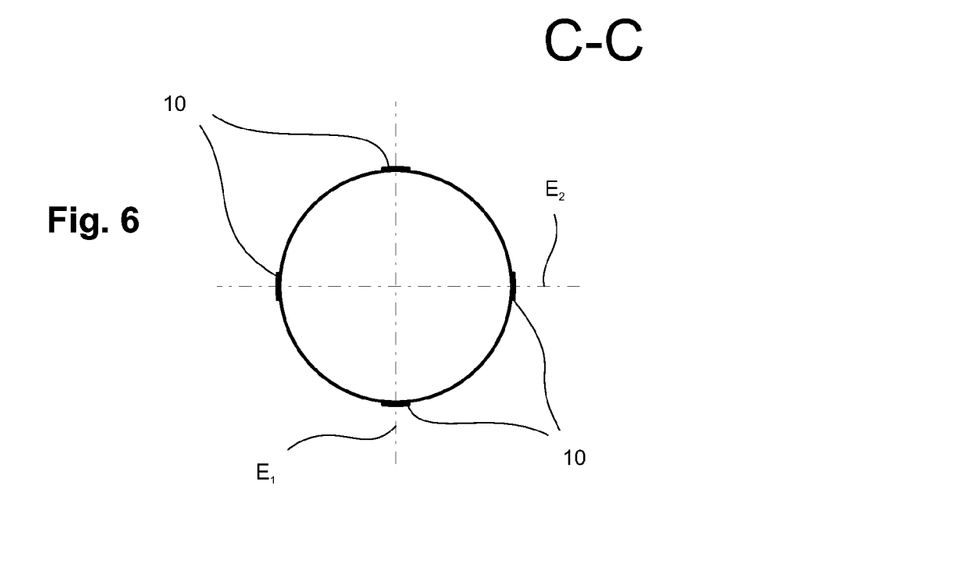
FIG. 6 represents a sectional view of the load cell of FIG. 5 in the plane C-C, with the first determining means installed below the obliquely aligned second determining means on the same contour-generating line as the second determining means.

FIG. 6 represents a sectional view of the load cell of FIG. 5 in the plane C-C. The second determining means 10 are distributed on a common diameter line, rotationally offset from each other in 90° steps relative to the central longitudinal axis 8. The strain gauges of the first determining means 9 are not visible here, as they are located behind the plane C-C in this drawing.

Figure 7:
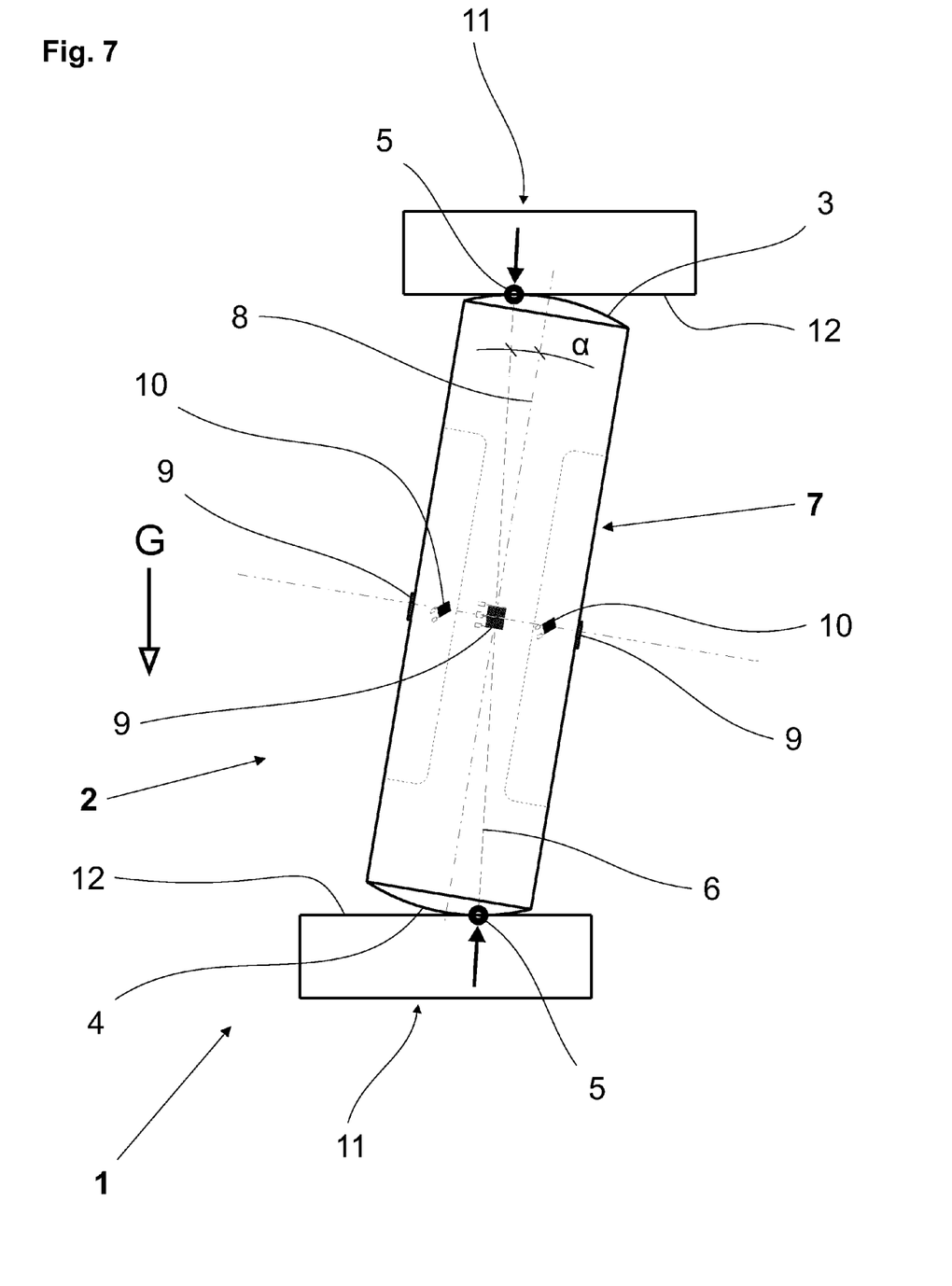
FIG. 7 shows a frontal view of the load cell of FIG. 1 in an out-of-vertical position, with a first determining means and with an obliquely aligned second determining means, and with the deformable body inclined at an angle.

The positional deviation of a load cell 1 results in a measurement error. FIG. 7 illustrates for the load cell of FIG. 1 a situation where the deformable body 2 is inclined at an angle relative to the vertical as a result of a parallel displacement of the load-introducing elements 11 relative to each other. With the parallel shift of the load-introducing elements 11, the respective support points 5 of the upper contact surface 3 and the lower contact surface 4 also change their positions. Consequently, the line of action 6 now deviates from the central longitudinal axis 8 by an angle α, but still passes through the center of the deformable body 2, provided the spherical radii of the upper and lower contact surfaces 3, 4 are equal to each other. In this situation, the first determining means 9 no longer provides an exact measurement of the weight force, but is subject to an error. The second determining means 10, which is slanted at an angle θ, is no longer aligned with the zero-deformation direction. Accordingly, the strain gauge of the second determining means 10 is subject to a change in length which produces a signal. This signal, which is a function of the parallel shift between the load-introducing elements and thus of the inclined position of the deformable body 2, is used for the calculation of the compensation.

In the zero-deformation direction a deformation of the deformable body 2 is likewise linear to the applied force. The conversion of the deformation in the zero strain direction, in the absence of ideal alignment, into an electronic signal by the second determining means 10 is thus proportionate to the amount of the deformation in the zero-deformation direction and thus represents a quantitative measurement. The converted signal of the second determining means 10 according to the above embodiment thus provides a quantitative statement of the inclined position of the load cell 1.

Figure 8:
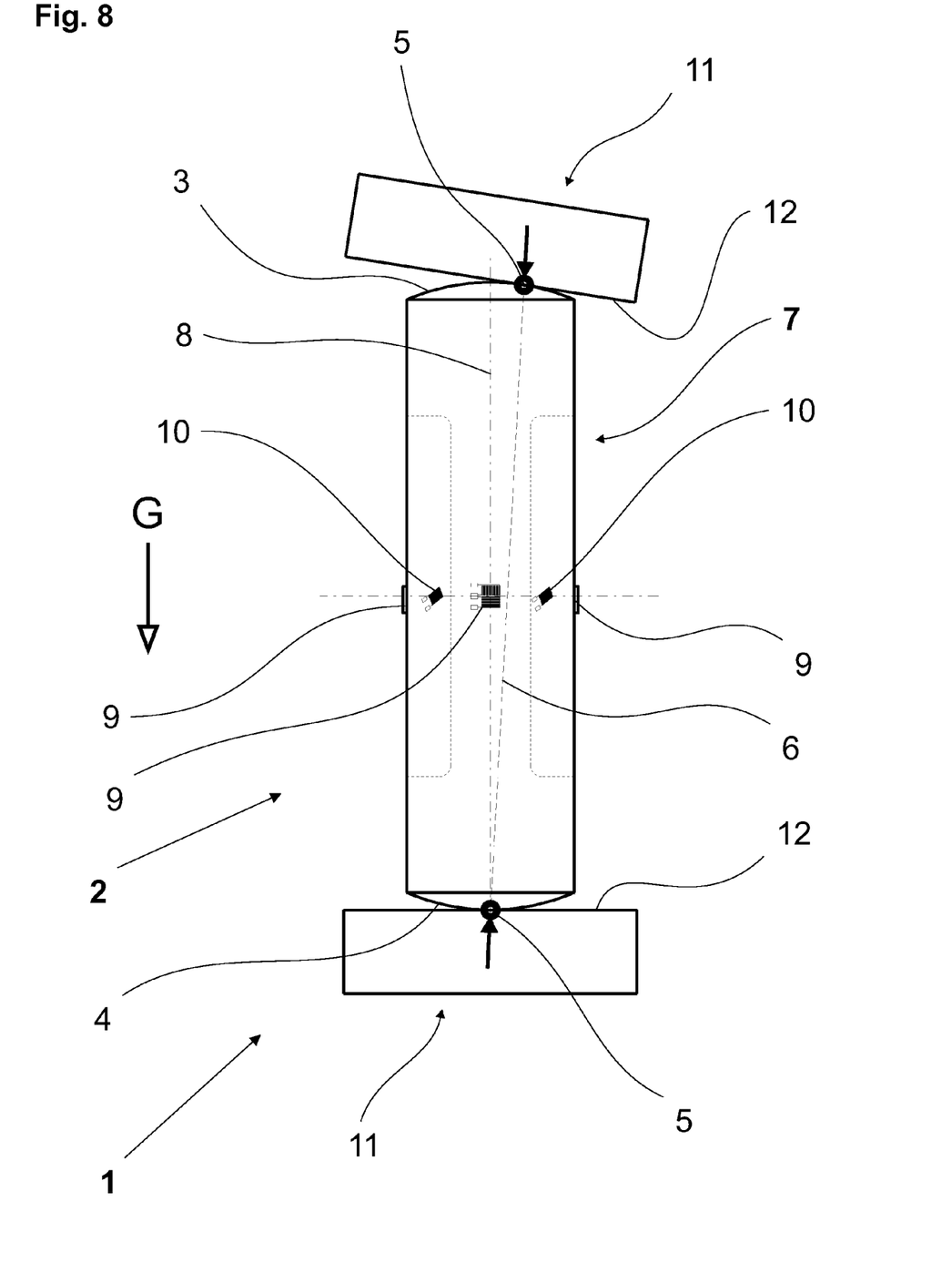
FIG. 8 shows a frontal view of the load cell of FIG. 1, with a first determining means and with an obliquely aligned second determining means, wherein the upper load-introducing element is tilted at an angle.

FIG. 8 shows the load cell of FIG. 1 in a state where the upper load-introducing element 11 is tilted at an angle. The upper support point 5 is shifted to the right, and as a result the line of action 6 of the force no longer coincides with the central longitudinal axis 8. The signal of the first determining means 9 no longer exactly corresponds to the weight force of the load to be measured, but needs to be corrected to compensate for the out-of-level position of the upper load-introducing element 11. This correction is calculated from the signals of the at least one strain gauge of the second determining means 10 which, due to the out-of-level condition, is no longer exactly aligned with the zero-deformation direction.

Figure 9:
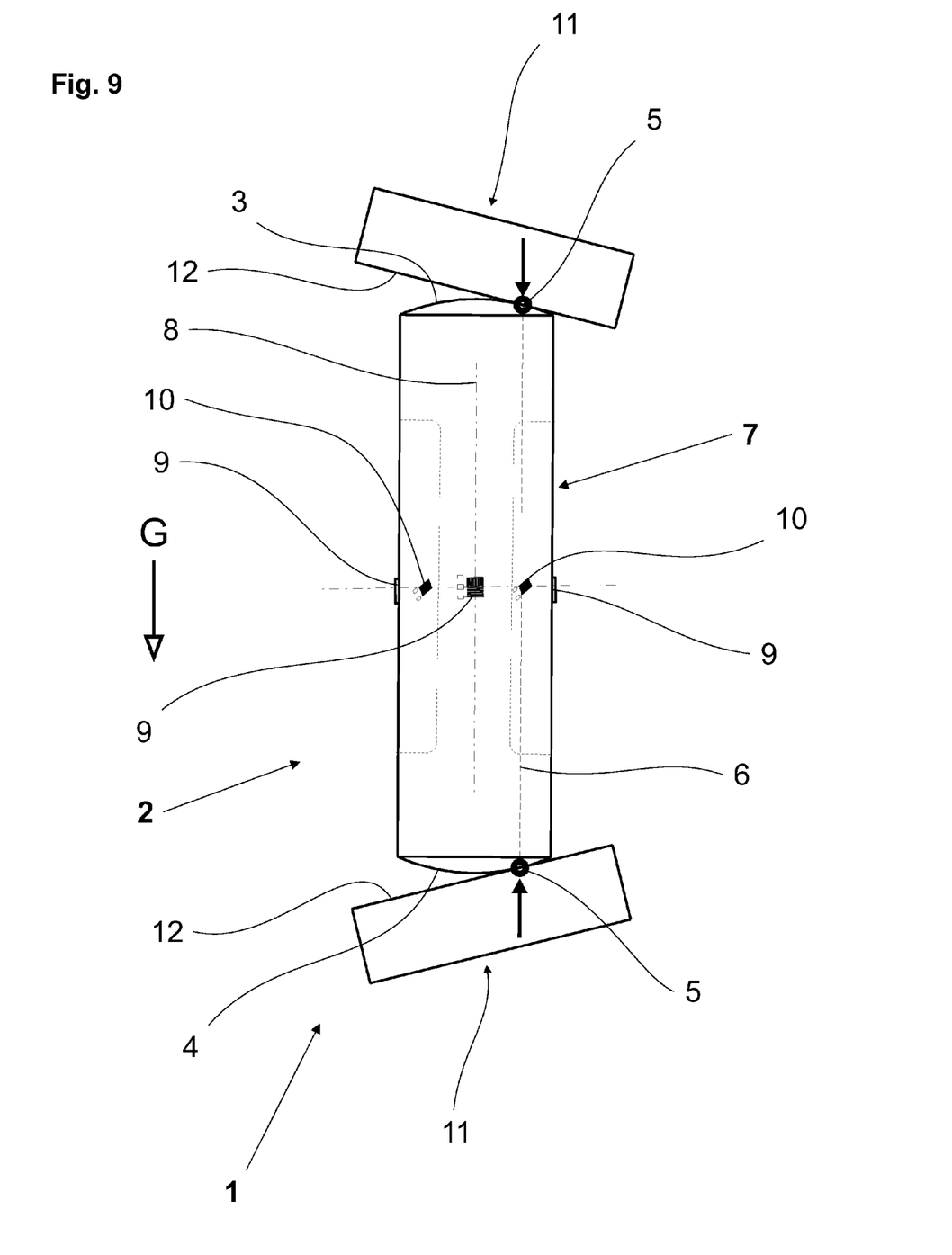
FIG. 9 shows a frontal view of the load cell of FIG. 1, with a first determining means and with an obliquely aligned second determining means, wherein the upper and lower load-introducing elements are tilted at an angle.

As an additional factor compared to the load cell 1 of FIG. 8, both of the load-introducing elements 11 in the load cell of FIG. 9 are tilted from their correct positions. Although the central longitudinal axis 8 is parallel to the line of action 6, the two lines do not coincide with each other, and as a result, the deformable body 2 is subjected to a bending deformation. Further correction procedures are available, which will not be elaborated here. Alternatively, additional strain gauges can be installed to supplement the second determining means 10. For example, in addition to the strain gauges aligned at the predefined acute angle, there can be four further strain gauges installed on the circumference at 90° intervals and aligned parallel to the central longitudinal axis 8, wherein diametrically opposite strain gauges act together to provide the calculation basis for determining the positional deviation and to calculate the compensation values.

Figure 10:
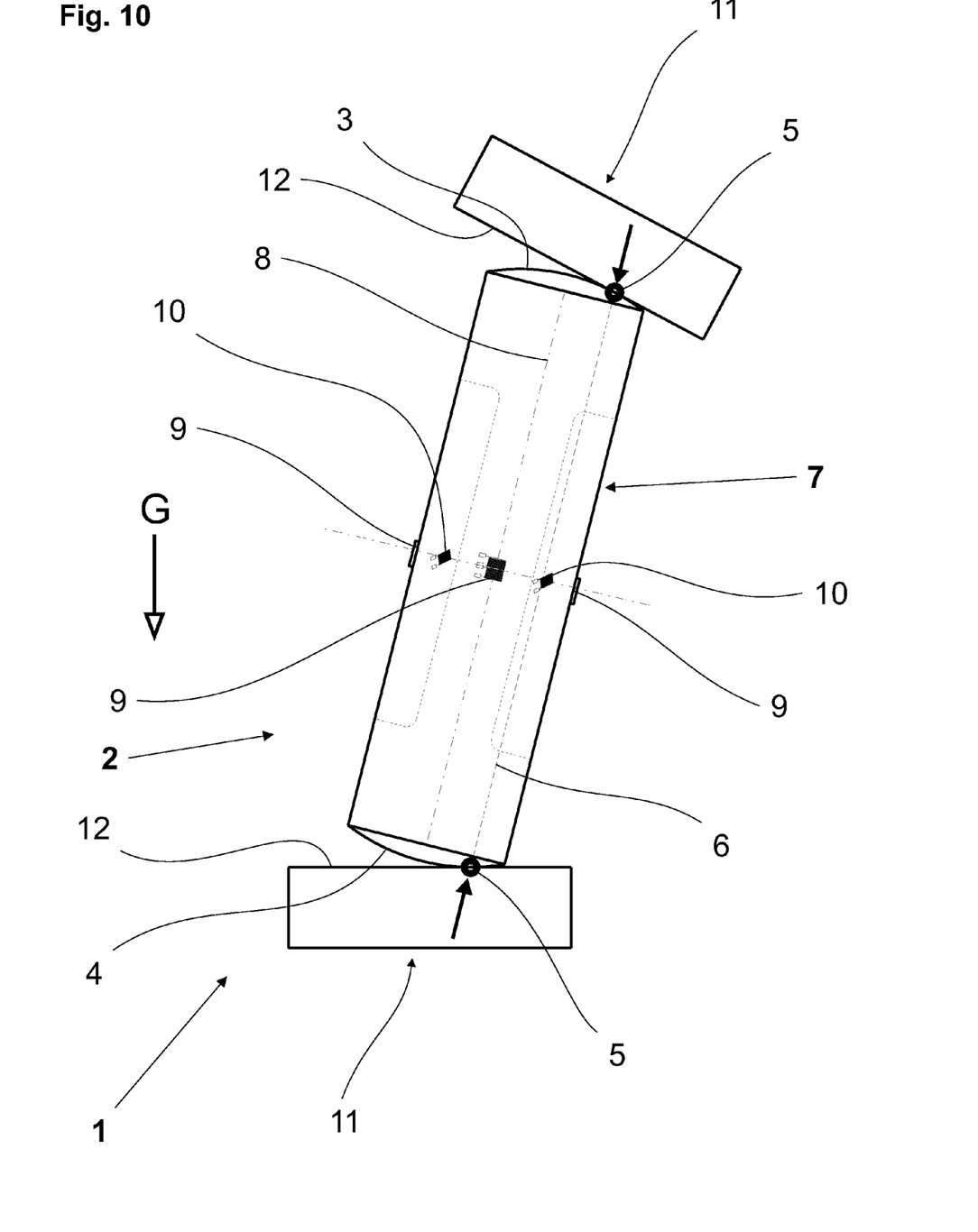
FIG. 10 shows a frontal view of the load cell of FIG. 1, with a first determining means and with an obliquely aligned second determining means, wherein the upper and lower load-introducing elements are tilted at an angle and the deformable body is inclined at an angle.

FIG. 10 illustrates a further misalignment of the load cell 1, wherein the conditions of an out-of-vertical position of the deformable body 2 and tilted positions of the load-introducing elements 11 are superimposed on each other, meaning that the surfaces 12 of the load-introducing elements 11 which face towards the deformable body 2 are no longer parallel to each other. The line of action 6 no longer intersects the central longitudinal axis 8 at the center of the deformable body 2, a fact which makes the computations for the correction of the measurement signal more difficult. As a result of installing on the column-shaped portion 7 of the deformable body 2 four pairs of strain gauges of the first determining means 9 and four strain gauges functioning as second determining means 10, a sufficient number of parameters can be determined in order to characterize the positional deviation and to compute compensatory corrections to be applied to the measurement signal.

The strain gauges of the first determining means 9 and the strain gauges of the second determining means 10 each produce an electrical signal representative of the respective amount of deformation in the direction of the strain gauge. Thus, a continuous measurement of the state of deformation takes place wherein the magnitude of the electrical signal reflects the amount of deformation.

In the processing unit (not shown) the electric signal of the first determining means 9 is corrected with the signal of the second determining means 10. As a result, the output of the load cell 1, which can be displayed on an indicator (not shown), represents a weight force $F_G$ which acts in the direction of gravity g.

Using the same number of strain gauges that are used in the arrangement according to JP 2007 033 137 A, the present invention opens the way to a more accurate compensation of position-related errors. Or viewed in a different light, a compensation that is equivalent in quality to the device of JP 2007 033 137 A can be achieved with a lower total number of strain gauges than are used in the device according to JP 2007 033 137 A.

Figure 11:
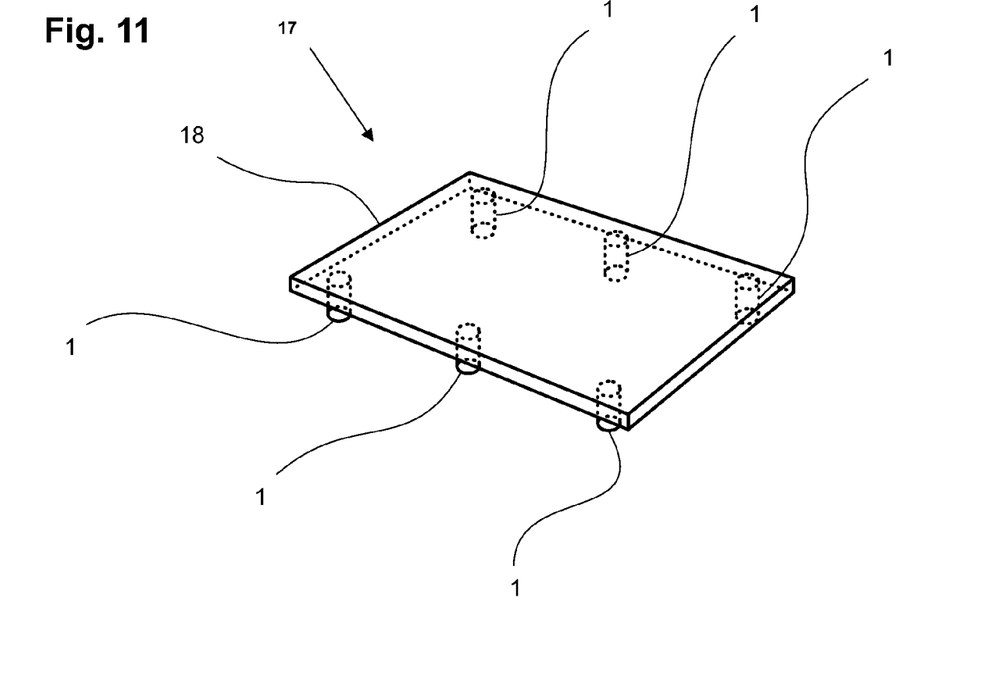
FIG. 11 shows an arrangement of several load cells in a weighbridge.

FIG. 11 illustrates a scale, specifically a vehicle scale 18. The weighbridge 18 is a level surface that serves to receive the weighing load. It is supported by at least three load cells, in the example of FIG. 11 by six load cells, which are arranged below the weighbridge 18 and thus are not interfering with the placement of the weighing load.

Figure 12:
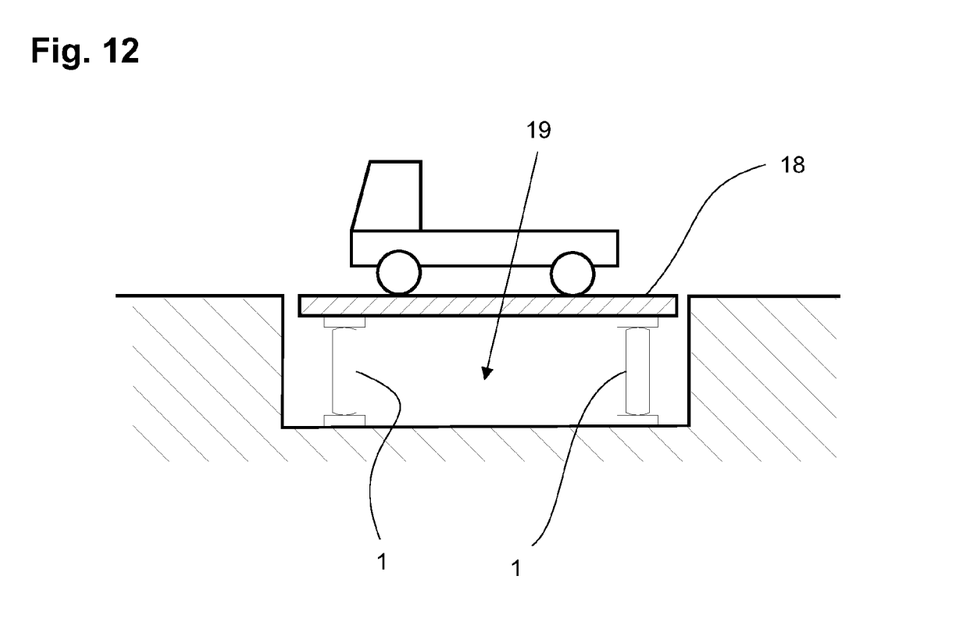
FIG. 12 represents a cross-sectional view of a vehicle scale seen from the side.

The load cells 2, in turn are resting on the supporting understructure which is designed so that there is no significant step that would impede the movement of the load onto the weighbridge. As illustrated in FIG. 12, this is realized with a scale pit which has the precise depth required so that the load surface of the weighbridge 18 and the adjacent ground lie in the same plane. The sectional view from the side in FIG. 12 shows two load cells 1. Two further load cells (the weighbridge rests on at least four load cells 1) are out of view as they are behind the two load cells 1 closest to the viewer. Depending on the size and the weighing capacity of the weighbridge, arrangements of six, eight or more load cells 1 may be used in practice.

Although the invention has been described by presenting examples of specific embodiments, it is considered evident that numerous further variants could be created based on the teachings of the present invention, for example by combining features of the individual embodiments with each other and/or by interchanging individual functional units between the embodiments.

REFERENCE SIGNS LIST 1 load cell
2 deformable body
3 upper contact surface
4 lower contact surface
5 support point
6 line of action (of the force)
7 column-shaped portion (of the deformable body)
8 central longitudinal axis (of the deformable body)
9 first determining means
10 second determining means
11 load-introducing element
12 side of load-introducing element that faces towards the load cell
17 scale
18 weighbridge
19 scale pit
$E_1$ first reference plane of misalignment
$E_2$ second reference plane of misalignment
G gravity force

The invention claimed is:

1. A load cell, comprising:
a deformable body with an upper contact surface and a lower contact surface, each contact surface containing a support point, the respective support points defining a line of action for a force introduced by a load-introducing element associated with the respective contact surface, the deformable body also having at least one column-shaped portion between the respective contact surfaces, the column-shaped portion having a central longitudinal axis and a circumferential surface whose generating line runs parallel to the central longitudinal axis;
a first determining means installed on the column-shaped portion for converting a mechanical deformation of the deformable body (2) into an electronic signal; and
a second determining means installed on the column-shaped portion for converting a deviation of the central longitudinal axis from the line of action into a representative signal, each of the respective determining means comprising at least one strain gauge, the at least one strain gauge of the second determining means installed essentially midway between the respective contact surfaces and aligned at a predetermined acute angle relative to the generating line of the circumference surface so that the signal of the second determining means is zero in the absence of a deviation of the central longitudinal axis from the line of action.

2. The load cell of claim 1, wherein:
a property of the material of the column-shaped portion is used to determine the magnitude of the predefined acute angle.

3. The load cell of claim 2, wherein:
the predefined acute angle lies in a range from 54° to 72°, dependent of the material that is being used in the column-shaped portion.

4. The load cell of claim 3, wherein:
for deformable bodies made of steel, the predefined acute angle is within 1.5 degrees of 61.3°.

5. The load cell of claim 1, wherein:
each of the respective determining means is installed on the circumferential surface of the column-shaped portion, particularly midway between the contact surfaces.

6. The load cell of claim 5, wherein: at least one of the respective determining means comprises at least two strain gauges or strain gauge pairs installed at diametrically opposite locations relative to the central longitudinal axis.

7. The load cell of claim 5, wherein:
at least one of the respective determining means comprises two strain gauges or strain gauge pairs, installed on the circumferential surface at locations that are rotationally offset from each other by an angle, particularly an angle of 90°, about the central longitudinal axis.

8. The load cell of claim 5, wherein:
the at least two strain gauges of the second determining means are installed, respectively, between the strain gauges of the first determining means, particularly midway between, and rotationally offset from each other by an angle of 90° about the central longitudinal axis.

9. The load cell of claim 5, wherein:
the second determining means comprises two strain gauges installed at the predefined acute angle and four further strain gauges that are aligned parallel to the central longitudinal axis and installed on the deformable body in pairs diametrically opposite each other, wherein the strain gauges that are aligned at the predefined acute angle and the two pairs of strain gauges, respectively, are rotationally offset from each other by an angle of 90° about the central longitudinal axis.

10. The load cell of claim 1, wherein:
that the column-shaped portion of the deformable body is divided along its central longitudinal axis into zones with at least two different diameters.

11. A weighing scale, specifically a vehicle scale, tank scale or container scale, comprising at least one load cell according to claim 1.

12. A method for compensating for a misalignment of a load cell, wherein the load cell comprises a deformable body with an upper contact surface and a lower contact surface, the respective contact surfaces each having a support point through which an associated load-introducing element introduces a force into the deformable body, with the two support points defining a line of action of the force introduced, the deformable body having, between the upper contact surface and the lower contact surface, at least one column-shaped portion with a central longitudinal axis and a circumferential surface whose generating line runs parallel to the central longitudinal axis, the load cell further comprising a first determining means and a second determining means, each of which comprises at least one strain gauge, the method comprising the steps of:
converting a mechanical deformation of the deformable body into a signal of the first determining means, using at least one strain gauge on the circumferential surface;
converting a deviation of the central longitudinal axis from the line of action into a signal of the second determining means, using at least one strain gauge on the circumferential surface, wherein the at least one strain gauge of the second determining means is installed midway between the upper contact surface and the lower contact surface and aligned at a predetermined acute angle relative to the generating line of the circumference surface, in such a way that the signal of the second determining means is zero in the absence of a deviation of the central longitudinal axis from the line of action;

registering the signal of the at least one strain gauge of the first determining means;

registering the signal of the at least one strain gauge of the second determining means which is aligned at the predetermined acute angle relative to the generating line of the circumference surface;

determining compensation values relative to a misalignment of the load cell, wherein at least one signal of the second determining means is used; and calculating a corrected weighing result based on the signal of the first determining means and the compensation values and, if applicable, further signals of the second determining means.

13. The method of claim 12, wherein:
in the determining step, a distinction is made between the conditions where the load-introducing elements are, respectively, offset parallel to each other, tilted at an angle to each other, or both offset as well as tilted relative to each other.

14. The method of claim 12, wherein:
the signals of the strain gauges of at least one of the respective determining means are determined in a processor unit individually and/or in pairs.

15. The method of claim 13, wherein:
the individual signals of the strain gauges of the respective determining means are processed sequentially in a processor unit.

16. The load cell of claim 2, wherein:
the Poisson ratio of the material of the column-shaped portion is used to determine the magnitude of the predefined acute angle.

17. The load cell of claim 10, wherein:
the deformable body is barbell-shaped.

* * * * *